US012761869B2

(12) United States Patent
Miller et al.

(10) Patent No.: US 12,761,869 B2
(45) Date of Patent: Oct. 13, 2026

(54) CONTACTLESS IN-PERSON TRANSACTION VIA HIGH FREQUENCY SOUND

(71) Applicant: CoinCircle, Inc., Santa Monica, CA (US)

(72) Inventors: Erick Stephen Miller, Marina Del Rey, CA (US); Ruslan G.M. AlJabari, Stanford, CA (US)

(73) Assignee: CoinCircle, Inc., Santa Monica, CA (US)

( * ) Notice: Subject to any disclaimer, the term of this patent is extended or adjusted under 35 U.S.C. 154(b) by 0 days.

(21) Appl. No.: 18/376,775

(22) Filed: Oct. 4, 2023

(65) Prior Publication Data

US 2024/0121012 A1 Apr. 11, 2024

Related U.S. Application Data

(60) Provisional application No. 63/425,171, filed on Nov. 14, 2022, provisional application No. 63/414,430,
(Continued)

(51) Int. Cl.

| | |
|---|---|
| ***G06F 3/16*** | (2006.01) |
| ***G06F 3/0484*** | (2022.01) |
| ***G06F 21/60*** | (2013.01) |
| ***G06Q 20/40*** | (2012.01) |
| ***G10K 11/34*** | (2006.01) |
| ***H04B 11/00*** | (2006.01) |

(52) U.S. Cl.
CPC ............ *G06F 3/167* (2013.01); *G06F 3/0484* (2013.01); *G06F 21/602* (2013.01); *G06Q 20/401* (2013.01); *G10K 11/34* (2013.01); *H04B 11/00* (2013.01)

(58) Field of Classification Search
CPC ...... G06F 3/167; G06F 3/0484; G06F 21/602; G06Q 20/401; G06Q 20/065; G06Q 20/123; G06Q 20/3272; G06Q 20/36; G06Q 20/3829; G10K 11/34; H04B 11/00
See application file for complete search history.

(56) References Cited

U.S. PATENT DOCUMENTS 10,748,133 B1 8/2020 Mossoba et al.
2013/0034251 A1 2/2013 Fincham
(Continued)

FOREIGN PATENT DOCUMENTS

CN 105190659 A * 12/2015 .......... G06Q 20/105
JP 5240832 B2 7/2013
(Continued)

OTHER PUBLICATIONS

PCT International Search Report and Written Opinion, PCT Application No. PCT/US2023/034474, Jan. 23, 2024, 10 pages.
(Continued)

*Primary Examiner* — Daniel Pihulic
(74) *Attorney, Agent, or Firm* — Fenwick & West LLP

(57) ABSTRACT

Systems and computer-implemented methods for generating and transmitting transaction requests are provided herein. The system includes a sender device that generates an audio signal encoding a package associated with the transaction request, and a receiver device that receives the audio signal and decodes the audio signal with an application to access the transaction request.

20 Claims, 11 Drawing Sheets

Related U.S. Application Data filed on Oct. 7, 2022, provisional application No. 63/414,425, filed on Oct. 7, 2022.

(56) References Cited

U.S. PATENT DOCUMENTS

| | | | | |
|---|---|---|---|---|
| 2013/0275305 | A1 | 10/2013 | Duplan | |
| 2013/0301392 | A1 | 11/2013 | Zhao | |
| 2014/0136981 | A1 | 5/2014 | Xiang et al. | |
| 2014/0142958 | A1* | 5/2014 | Sharma | G10L 19/018 704/500 |
| 2014/0156510 | A1 | 6/2014 | Howe | |
| 2014/0244514 | A1* | 8/2014 | Rodriguez | G06Q 20/227 348/150 |
| 2015/0365384 | A1 | 12/2015 | Rider Jimenez | |
| 2016/0314453 | A1 | 10/2016 | Rogers | |
| 2018/0199138 | A1 | 7/2018 | Dusan et al. | |
| 2019/0188682 | A1 | 6/2019 | Itwaru et al. | |
| 2019/0342659 | A1 | 11/2019 | Lau | |
| 2020/0051534 | A1 | 2/2020 | Bradley et al. | |
| 2020/0137509 | A1 | 4/2020 | Stanek et al. | |
| 2021/0068178 | A1 | 3/2021 | Kim et al. | |
| 2021/0287223 | A1 | 9/2021 | Lee et al. | |
| 2023/0186276 | A1 | 6/2023 | Storiale et al. | |
| 2024/0118865 | A1* | 4/2024 | Miller | H04B 11/00 |
| 2024/0121012 | A1* | 4/2024 | Miller | G10K 11/34 |

FOREIGN PATENT DOCUMENTS

| | | | | |
|---|---|---|---|---|
| KR | 10-2019-0105730 A | | 9/2019 | |
| KR | 10-2089638 B1 | | 3/2020 | |
| WO | WO-2024076639 A1 | * | 4/2024 | G06F 21/602 |
| WO | WO-2024076640 A1 | * | 4/2024 | G06F 21/602 |

OTHER PUBLICATIONS

PCT International Search Report and Written Opinion, PCT Application No. PCT/US2023/034476, Jan. 29, 2024, 12 pages.

United States Office Action, U.S. Appl. No. 18/376,777, filed Oct. 21, 2025, 17 pages.

Chirp + PayPal [online]. Medium.com, 2018, retrieved on Mar. 3, 2026 from <url: https://medium. com/chirp-io/chirp-paypal-6e8e02c1d67f> (Year: 2018).

Final Rejection Mailed on Mar. 12, 2026 for U.S. Appl. No. 18/376,777, 17 page(s).

* cited by examiner

TWO WAY MODE

REASSEMBLING PAYLOAD

CONTACTLESS IN-PERSON TRANSACTION VIA HIGH FREQUENCY SOUND

CROSS REFERENCE TO RELATED APPLICATION

This application claims priority to U.S. Provisional Patent Application Ser. No. 63/414,425, "Contactless In-Person Transaction via High Frequency Sound," filed Oct. 7, 2022. This application also claims priority to U.S. Provisional Patent Applications Ser. No. 63/414,430, filed on Oct. 7, 2022 and Ser. No. 63/425,171, filed on Nov. 14, 2022. The subject matters of all of the foregoing provisional applications are incorporated herein by reference in their entirety.

SUMMARY

Embodiments relate to an in-person contactless communication protocol. In some embodiments, a first application causes a speaker of a sender device to generate an audio signal that encodes a package associated with a transaction request. The audio signal can be received at a receiver device. The audio signal can be decoded at the receiver device with an application to access the transaction request.

In some embodiments, a system for transmitting a transaction includes a sender device and a receiver device. The sender device has a first application that causes a speaker to generate an audio signal that encodes an audio signal that encodes a package associated with a transaction request. The receiver device has a second application that causes a microphone to receive the audio signal. The second application also decodes the audio signal to access the transaction request.

In some embodiments, a non-transitory computer-readable medium that is configured to store instructions is described. The instructions, when executed by one or more processors, cause the one or more processors to perform a process that includes steps described in the above computer-implemented methods or described in any embodiments of this disclosure. In some embodiments, a system may include one or more processors and memory coupled to the processors that is configured to store instructions. The instructions, when executed by one or more processors, cause the one or more processors to perform a process that includes steps described in the above computer-implemented methods or described in any embodiments of this disclosure.

BRIEF DESCRIPTION OF THE DRAWINGS

FIG. (Figure) 1 is an example system environment, in accordance with some embodiments.

Figure 1:
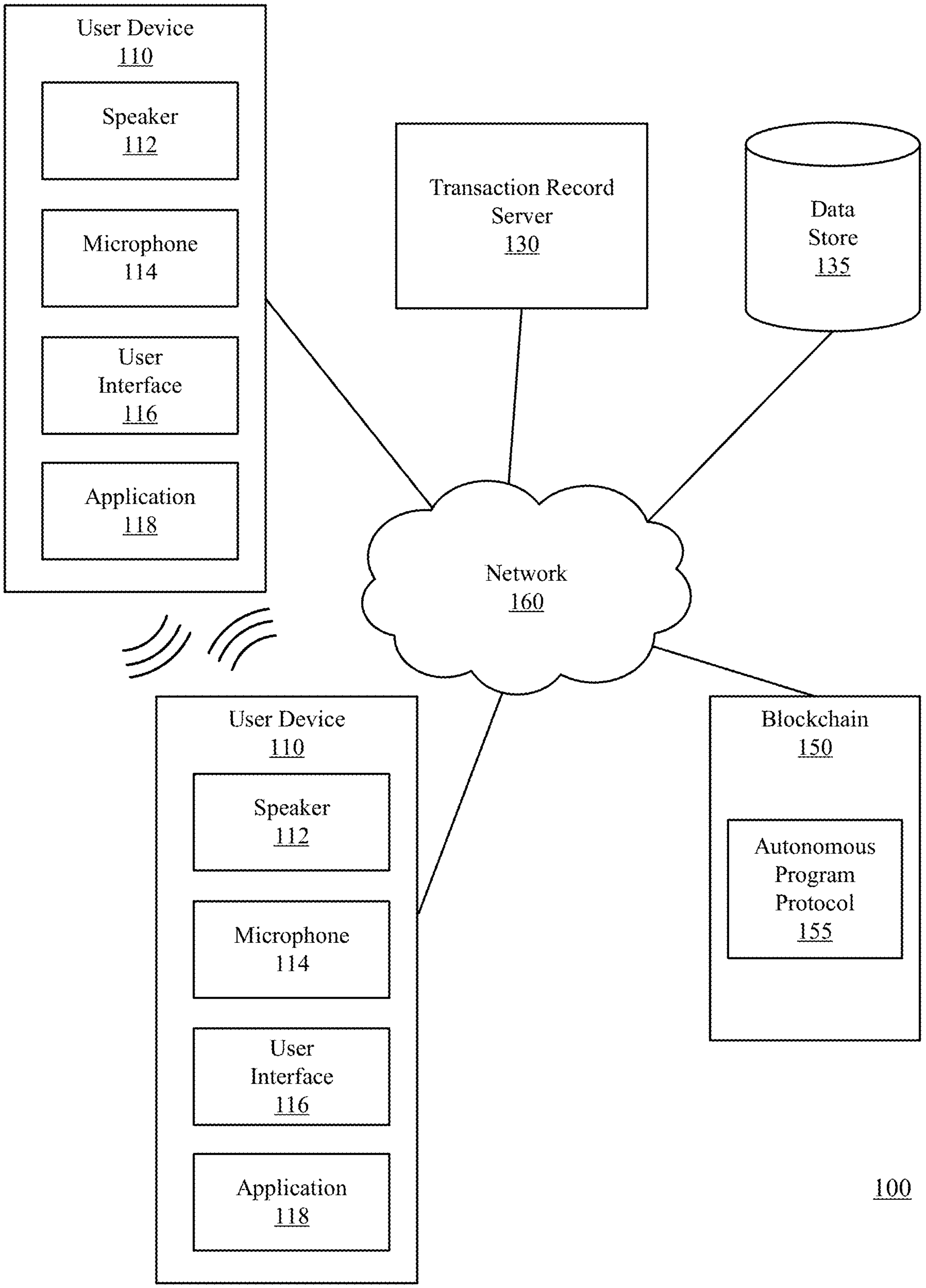

The figures depict and the detail description describes various non-limiting embodiments for purposes of illustration only.

DETAILED DESCRIPTION

The figures (FIGS.) and the following description relate to preferred embodiments by way of illustration only. One of skill in the art may recognize alternative embodiments of the structures and methods disclosed herein as viable alternatives that may be employed without departing from the principles of what is disclosed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

System Overview

FIG. (Figure) 1 is a block diagram that illustrates a system environment 100 of an example computing server, in accordance with an embodiment. By way of example, the system environment 100 includes two or more user devices 110, a transaction record server 130, a data store 135, a blockchain 150, and an autonomous program protocol 155. The entities and components in the system environment 100 communicate with each other through the network 160. In addition, the user devices 110 may communicate with each other and conduct transactions directly in-person through high-frequency sound o that is generated by the speakers 112 of the user devices 110. High-frequency sound may include near-ultrasound sound that is inaudible and ultrasound. In some embodiments, the sound signals may have the frequencies in the inaudible ranges of 20,000 Hz to 22,000 Hz and in the less inaudible range of 16,000 Hz to 19,000 Hz. The volumes of the devices may be in the range of 1 dB to 84 dBs.

In various embodiments, the system environment 100 may include different, fewer, or additional components. The components in the blockchain system environment 100 may each correspond to a separate and independent entity or may be controlled by the same entity. For example, in some embodiments, the transaction record server 130 may control the data store 135.

While each of the components in the system environment 100 is often described in disclosure in a singular form, the system environment 100 may include one or more of each of the components. For example, there can be multiple user devices 110 conducting in person contactless transactions that will be discussed in further detail below. Each user device 110 is used by an end user and there can be millions or billions of end users in this system environment 100. Also, the transaction record server 130 may be part of a payment server that provides services to multiple end users that may operate different user devices 110. While a component is described in a singular form in this disclosure, it should be understood that in various embodiments the component may have multiple instances. Hence, in the system environment 100, there can be one or more of each of the components.

The user device 110 may include a speaker 112, a microphone 114, a user interface 116, and an application 118. In various embodiments, the user device 110 may include one or more of those components. In some embodiments, the user device 110 may include different, fewer, or additional components. A user device may also be referred to as a client device. A user device 110 may be controlled by a user who may be a customer of the transaction record server 130 or a participant of the blockchain 150. The user device 110 may be any computing device. Examples of user devices 110 include personal computers (PC), desktop computers, laptop computers, tablet computers, smartphones, wearable electronic devices such as smartwatches, or any other suitable electronic devices. In some embodiments, one of the user devices 110 may take the form of a payment device such as a point-of-sale (POS) device that may be a card reader but also include the capability to use the in-person contactless communication protocol described in various embodiments herein.

The users may use the in-person contactless communication protocol described in various embodiments herein to conduct transactions with each other. The transactions may include peer-to-peer direct transaction, such as direct payment, cryptocurrency or token transactions, whether through a cryptocurrency trading platform (e.g., an exchange, a broker, etc.) or directly on a blockchain, decentralized digital and cryptocurrency transactions, checkout, digital credit card payment, and other suitable transactions. Additionally, or alternatively, the users may also use the in-person contactless communication protocol to interact each other such as by sending messages and sharing files.

A user device 110 is equipped with a speaker 112 for transmitting high-frequency sound signals and a microphone 114 for receiving the high-frequency sound signals. While it may not be the primary design purpose, most smartphones or other electronic devices nowadays are equipped with microphone 114 and/or speaker 112 that is capable of generating high-frequency sound signals in at least one or more frequency spectrums. As discussed in further detail below, one of the user devices 110 may use the speaker 112 to broadcast a message, such as an audio signal, to initiate a communication under an in-person contactless communication protocol.

The intended recipient user device 110 may receive the message, such as the audio signal, through the microphone 114. The communication may be in a one-way mode or a two-way mode. In some embodiments, the two user devices 110 may use the in-person contactless communication protocol to complete a transaction. For example, the transaction may be associated with a payment transfer or a file transfer. In some embodiments, the in-person contactless communication protocol may be used to establish an initial connection, such as a handshake procedure or to create a shared session key, and the two user devices 110 may in turn switch to another protocol such as WIFI or Bluetooth to continue the communication.

The user device 110 may include a user interface 116 and an application 118. The user interface 116 may be the interface of the application 118 and allow the user to perform various actions associated with application 118. The application 118 may be a software application that allows a first user to generate a transaction request (e.g., initiate a payment request, initiate a payment, initiate a file transfer) for the in-person contactless communication protocol and a second user to complete the transaction request (e.g., accept the payment request or the file request). The application 118 may provide various options such as selection of payment amount and linking of credit card, blockchain wallet, and bank accounts for the users.

The application 118 may also provide functionalities to facilitate the completion of the transaction. For example, the application 118 on the recipient side may initiate the microphone 114 of the recipient user device 110 so that the user device 110 begins to actively listen for sound signal that is broadcasted by the sender user device 110. In another example, the application 118 may provide visual guidance for the user to physically align the user devices 110 in order for the high-frequency sound signal to be received. Upon completion of an in-person transaction, the application 118 may upload the record of the transaction to the transaction record server 130.

The user interface 116 may take different forms. In some embodiments, the user interface 116 is a software application interface. For example, the user interface 116 may be a front-end software application that can be displayed on a user device 110. In one case, the front-end software application is a software application that can be downloaded and installed on a user device 110 via, for example, an application store (App store) of the user device 110. In another case, the front-end software application takes the form of a webpage interface that allows clients to perform actions through web browsers. The front-end software application includes a graphical user interface (GUI) that displays various information and graphical elements.

A transaction record server 130 may be a server that provides various record keeping functionalities for the in-person transaction requests that occur between two user devices 110. In some embodiments, the operator of the transaction record server 130 may be the company that publishes the application 118 to allow users to conduct in-person transaction requests. In some embodiments, an in-person transaction request is a payment request from one user to another. The application 118 may upload the completed transaction record to the transaction record server 130, and the transaction record server 130 may reflect the change in balances in the user accounts (e.g., bank accounts, crypto accounts, credit/debit card accounts). In some embodiments, an in-person transaction is a cryptocurrency (e.g., token, NFT) exchange. The transaction record server 130 may reflect the exchange in its ledger. In some cases, the transaction record server 130 may also manage blockchain wallets on behalf of the users. If the exchange is to be directly performed on the blockchain, the transaction record server 130 may broadcast the transaction to the blockchain to complete the transaction as a new block is generated. In some embodiments, the blockchain transaction, such as the broadcast of the transaction, is directly done by the application 118 from the individual user device 110.

In some embodiments, an in-person transaction request may be a checkout process between a smartphone of a user and a POS device of a merchant. Both the smartphone and the POS device may be examples of the user devices 110 and the POS device may update the purchase record to the transaction record server 130. Other suitable record keeping and related actions may also be performed by the transaction record server 130.

The data store 135 includes one or more storage units such as memory that takes the form of non-transitory and non-volatile computer storage medium to store various data. The computer-readable storage medium is a medium that does not include a transitory medium such as a propagating signal or a carrier wave. The data store 135 may be used by the transaction record server 130, and/or the user device 110 to store relevant data related to authentication. In some embodiments, the data store 135 communicates with other components by the network 160. This type of data store 135 may be referred to as a cloud storage server. Example cloud storage service providers may include AMAZON AWS, DROPBOX, RACKSPACE CLOUD FILES, AZURE BLOB STORAGE, GOOGLE CLOUD STORAGE, etc. In another embodiment, instead of a cloud storage server, the data store 135 is a storage device that is controlled and connected to the transaction record server 130. For example, the data store 135 may take the form of memory (e.g., hard drives, flash memory, discs, ROMs, etc.) used by the transaction record server 130 such as storage devices in a storage server room that is operated by a server.

A blockchain 150 may be a public blockchain that is decentralized, a private blockchain or a semi-public blockchain. A public blockchain network includes a plurality of nodes that cooperate to verify transactions and generate new blocks. In some implementations of a blockchain, the generation of a new block may also be referred to as a mining process or a minting process. Some of the blockchains 150 support smart contracts, which are a set of code instructions that are stored on a blockchain 150 and are executable when one or more conditions are met. Smart contracts may be examples of autonomous program protocols 155. When triggered, the set of code instructions of a smart contract may be executed by a computer such as a virtual machine of the blockchain 150. Here, a computer may be a single operation unit in a conventional sense (e.g., a single personal computer) or may be a set of distributed computing devices that cooperate to execute the code instructions (e.g., a virtual machine or a distributed computing system). A blockchain 150 may be a new blockchain or an existing blockchain such as BITCOIN, ETHEREUM, EOS, NEO, SOLANA, AVALANCHE, etc.

The autonomous program protocols 155 may be tokens, smart contracts, Web3 applications, autonomous applications, distributed applications, decentralized finance (DeFi) applications, protocols for decentralized autonomous organizations (DAO), non-fungible tokens (NFT), and other suitable protocols and algorithms that may be recorded on a blockchain.

The communications among the user device 110, the transaction record server 130, the autonomous application 124, and the blockchain 150 may be transmitted via a network 160, for example, via the Internet. In some embodiments, the network 160 uses standard communications technologies and/or protocols. Thus, the network 160 can include links using technologies such as Ethernet, 802.11, worldwide interoperability for microwave access (WiMAX), 3G, 4G, LTE, 5G, digital subscriber line (DSL), asynchronous transfer mode (ATM), InfiniBand, PCI Express Advanced Switching, etc. Similarly, the networking protocols used on the network 160 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 160 can be represented using technologies and/or formats including the hypertext markup language (HTML), the extensible markup language (XML), etc. In addition, all or some of the links can be encrypted using conventional encryption technologies such as secure sockets layer (SSL), transport layer security (TLS), virtual private networks (VPNs), Internet Protocol security (IPsec), etc. The network 160 also includes links and packet switching networks such as the Internet.

Example Transaction Process

Figure 2:
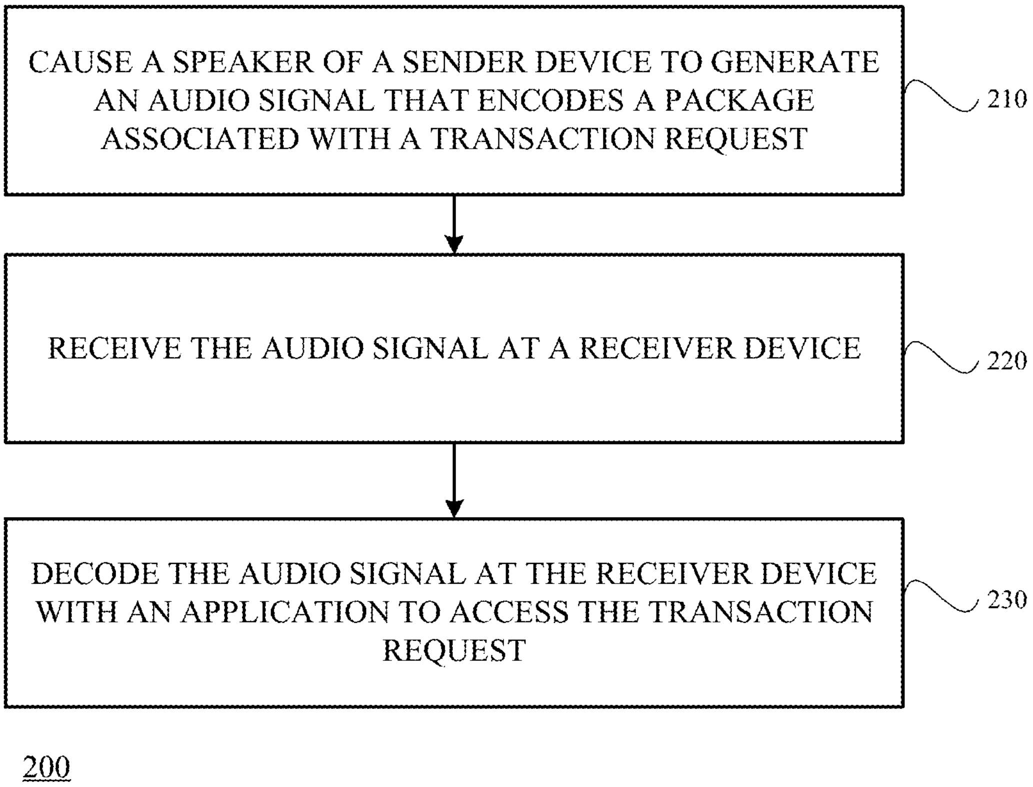
FIG. 2 is a flowchart depicting an example process for performing a transaction using in-person contactless communication protocol, in accordance with some embodiments.

FIG. 2 is a flowchart depicting an example process 200 for performing a transaction request using in-person contactless communication protocol, in accordance with some embodiments. The process 200 may be embodied as a combination of hardware and a software algorithm that may be stored as computer instructions that are executable by one or more processors. The instructions, when executed by the processors, cause the processors to perform various steps in the process 200. In various embodiments, the process 200 may include additional, fewer, or different steps.

At 210, a speaker of a device generates an audio signal (or a sound signal) that encodes a package associated with a transaction request. For example, a first application installed on the device can cause the speaker to generate the audio signal.

As further mentioned in the present disclosure, the audio signal can include high-frequency sound. For example, the audio signal can be ultrasound or near-ultrasound sound that is inaudible. For example, the audio signal can be an inaudible sound that is in a frequency range of human hearing. For example, the audio signal can be masked to be imperceptible to human hearing. For example, the audio signal can have the frequencies in the inaudible ranges of 20,000 Hz to 22,000 Hz and in the less inaudible range of 16,000 Hz to 19,000 Hz. The volumes of the devices producing the audio signal may be in the range of 1 dB to 84 dBs.

In some embodiments, the audio signal can be modulated using frequency-shift keying (FSK), binary frequency-shift keying (BFSK), continuous-phase frequency-shift keying (CPFSK), Gaussian frequency-shift keying (GFSK), minimum-shift keying (MSK), differential phase-shift keying (DPSK), offset quadrature phase-shift keying (OQPSK), or continuous phase modulation (CPM).

In some embodiments, packages associated with the transaction request can include a file format such as: a user identifier, a merchant identifier, a payment processor, a payment gateway, a transaction type, a payment total, a currency code, a wallet address, an IP address, a public key, and an encryption key. Packages associated with a transaction request can be encrypted prior to transmission.

At 220, the audio signal is received at a receiver device. For example, the second application can cause a microphone of the receiver device to listen to incoming sound. The incoming sound may audio signals encoding packages associated with transaction requests.

At 230, the received audio signal is decoded at the receiver device to access the transaction request. For example, the second application decodes the audio signal to retrieve the transaction request. Information related to the transaction request can be transmitted to a transaction record server.

The present transaction request protocol presents significant advantages over the prior art. For example, it is known that some current payment platforms have walls to curb competitions and achieve market dominance. For example, some platforms do not allow payment transactions unless a fee is paid. For example, some platforms do not allow people to perform payment transactions unless the transaction is performed on a specific device provided by such platforms. Furthermore, if transaction requests were to be implemented on protocols like Bluetooth or Wi-fi, the user experience would be likely be unpleasant and/or the transaction requests would probably hit technology walls put up by the aforementioned platforms.

Advantageously, the present transaction request protocol enables communication of transaction requests using sound as the data transport medium. The present protocol offers significant advantages because it is platform-agnostic such that it can be used with any type of devices as long as they include a speaker and/or a microphone. Therefore, the present protocol works regardless of the underlying systems technology or architecture. For example, this is the type of protocol that can be made a cross-platform standard.

In some embodiments, the receiver device can indicate to a user to align a direction of the speaker generating the audio signal at the sender device towards the microphone of the receiver device to improve reception of the audio signal by the receiver device.

In some embodiments, the receiver device can indicate to a user to maintain the speaker of the sender device and the microphone of the receiver device within a predetermined distance to improve reception of the audio signal by the receiver device.

In some embodiments, the second application can decode the received audio signal to retrieve the transaction request. Once the transaction request has been retrieved, the second application can interact with the transaction request and use a transaction service to process the transaction associated with the transaction request.

The second application can communicate with the transaction service by using application programming interfaces (APIs).

In some embodiments, the transaction service can be a software application that provides a service for file transfer.

Figure 7A:
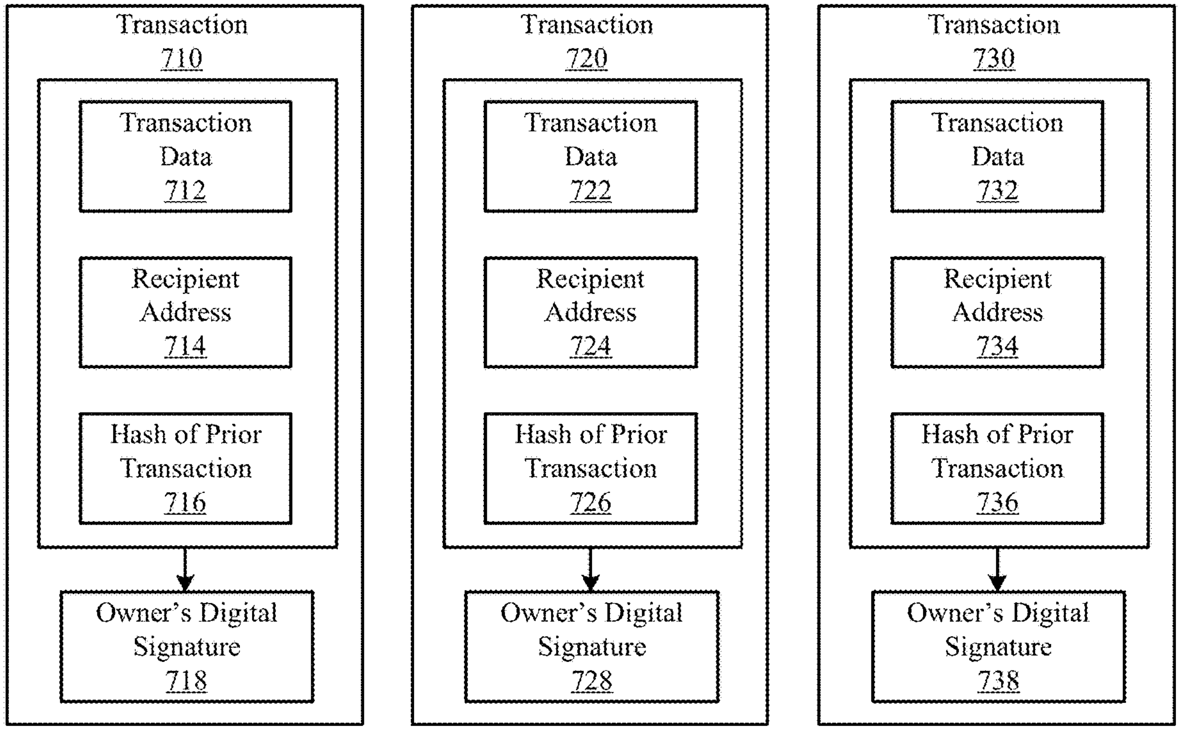
FIG. 7A is a block diagram illustrating a chain of transactions broadcasted and recorded on a blockchain, in accordance with an embodiment.
Figure 7B:
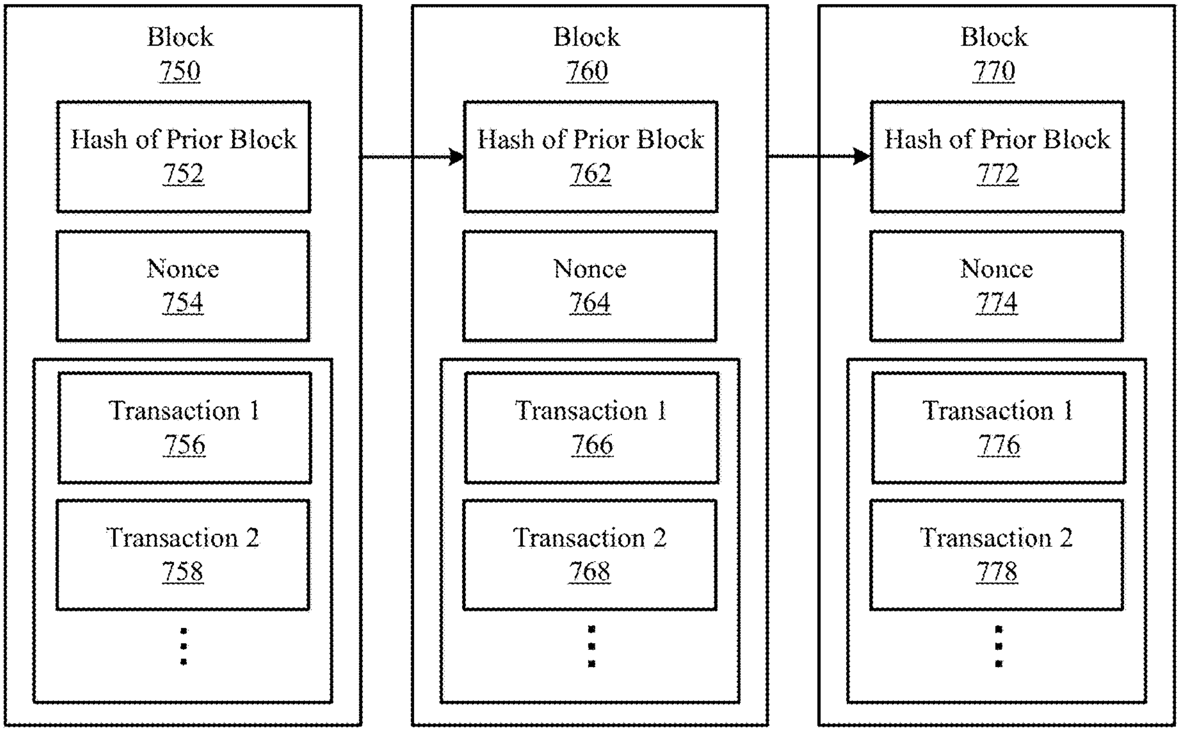
FIG. 7B is a block diagram illustrating a connection of multiple blocks in a blockchain, in accordance with an embodiment.

In some embodiments, the transaction service can be a software application that provides a payment service, such as a payment processing software. Examples of payment processing software can include blockchain applications as shown in FIGS. 7A and 7B, which are discussed further in the present disclosure.

The in-person contactless communication protocol may take the form of a peer-to-peer protocol with algorithms that enable instant in-person contactless transaction requests using sound as the data transport medium. The frequencies of the audio signal, in some embodiments, can be high frequency sound audio but are generally adjusted as needed. The protocol works via one device initiating instructions from any computer devices' speakers to broadcast audio signals that are encoded with data. The protocol utilizes microphone on another device to recognize the initiation of the protocol. The microphone may be always-on or may be turned on by the use of application 118. The recipient user device 110 may receive and process the audio signals and execute actions based on instructions contained within the broadcasted data. Actions that the recipient user device 110 may execute include sending a transaction, signing and sending a cryptographic signature using a public private key pair, etc.

In some embodiments, the protocol can be initiated by specifying the chosen sound frequency desired to operate on which may be configured on any number of user devices 110 that are desired to communicate with each other on said frequency. The protocol can take control of the microphone 114 and speaker 112, audio cards of the devices, and can ready the microphone 114 and speaker 112 for sending and receiving data in the form of packets. In some embodiments, the protocol operates in two modes: an interactive two-way, multi-channel communication mode and a non-interactive one way communication channel. The protocol differentiates those two modes by maintaining one or more active sessions between a single connection (interactive) or not (non-interactive).

Figure 3:
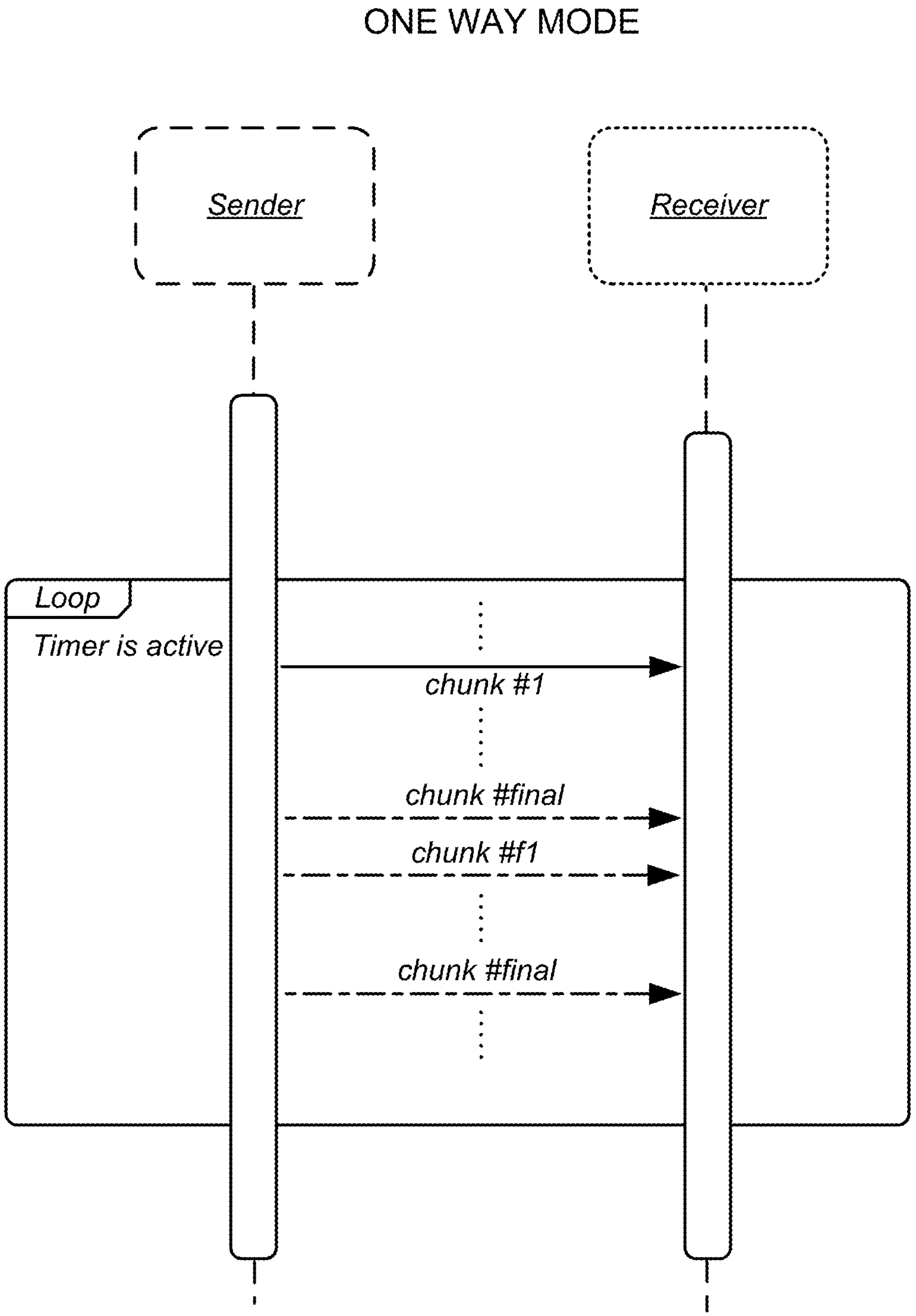
FIG. 3 is a conceptual diagram illustrating a one-way communication mode, in accordance with some embodiments.

FIG. 3 is a conceptual diagram illustrating a one-way communication mode, in accordance with some embodiments. The protocol operates in a one way setting, sending the data for a set period of time without needing any sort of response from the receiving parties. In the one way non-interactive protocol mode, the sender keeps sending the chunks of data while a specified timer is active.

Figure 4A:
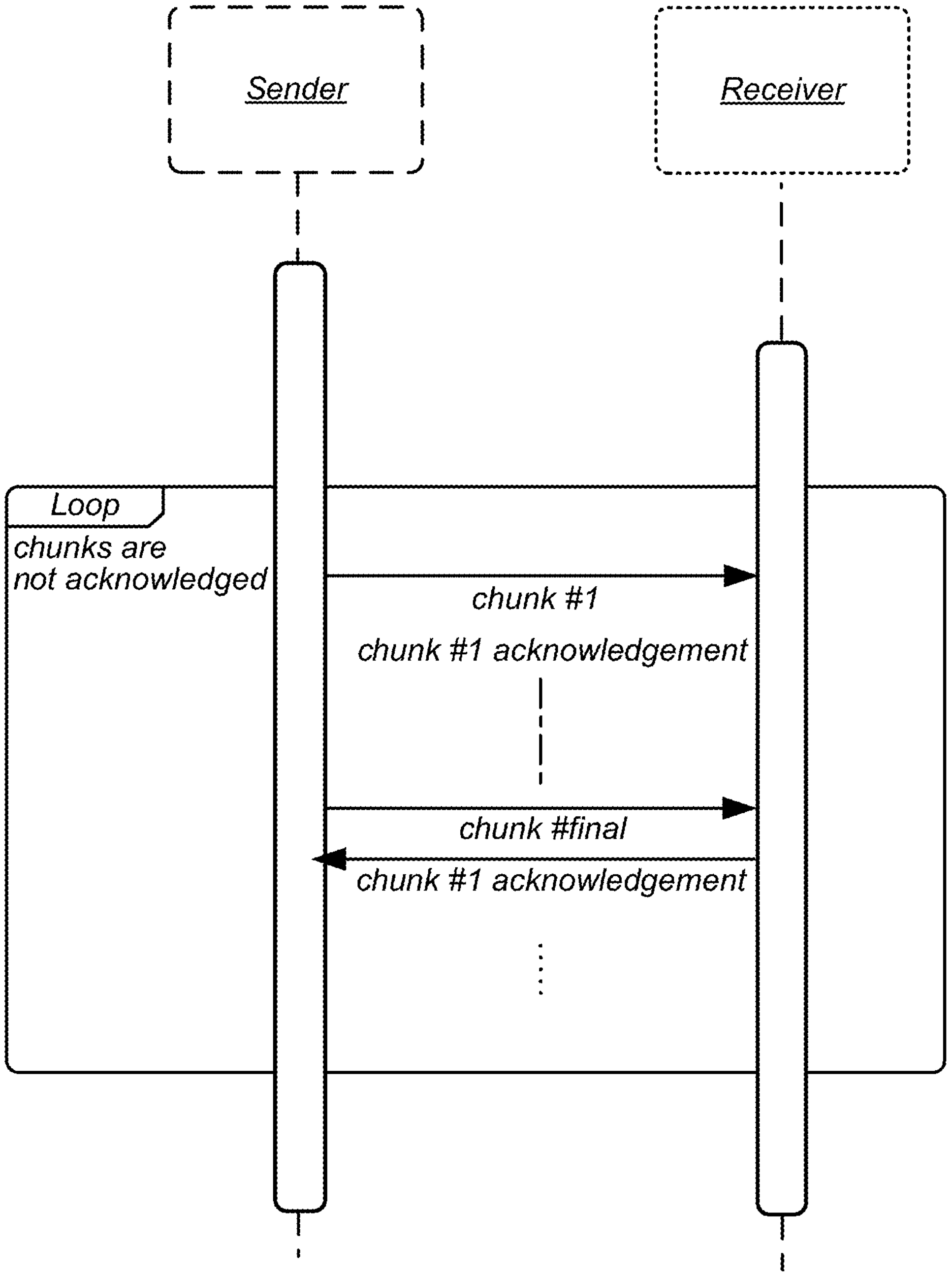
FIG. 4A is a conceptual diagram illustrating a two-way communication mode, in accordance with some embodiments.

FIG. 4A is a conceptual diagram illustrating a two-way communication mode, in accordance with some embodiments. In the two-way mode, the protocol operates by maintaining a two-way interactive communication channel between the participating user devices 110 during which information exchange occurs. In the two-way interactive protocol mode, the sender and receiver exchange packets (data chunk packets from the sender and response packets from the receiver) for as long as there are outstanding chunks that have not been acknowledged by a response packet from the receiver.

Figure 4B:
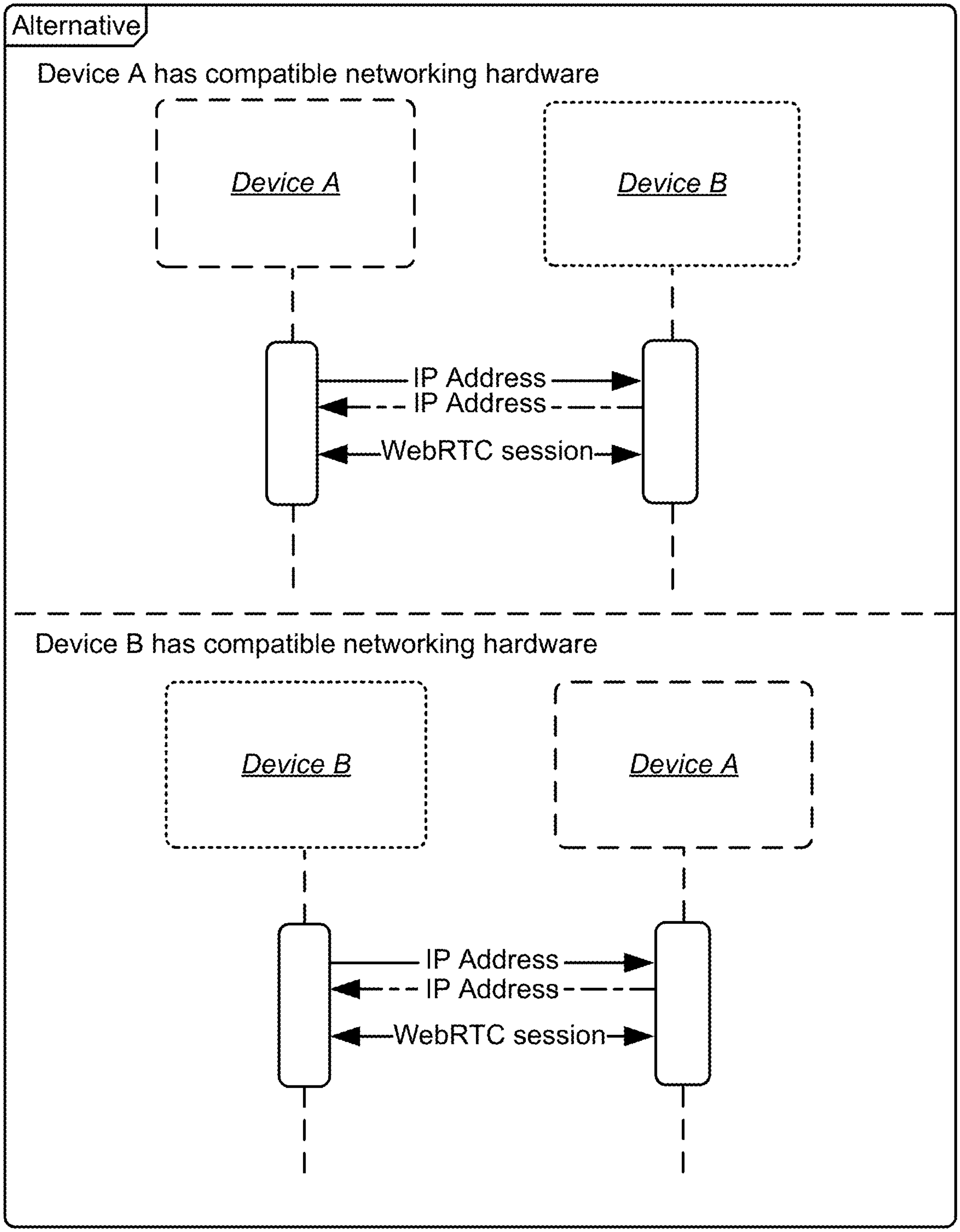
FIG. 4B is a conceptual diagram illustrating another example of a two-way communication mode, in accordance with some embodiments.

FIG. 4B is a conceptual diagram illustrating another example of a two-way communication mode, in accordance with some embodiments. In some embodiments, two devices may begin communication using the two-way mode illustrated in FIG. 4A while establishing another peer-to-peer channel on top using a real-time communication protocol such as the WebRTC protocol in the event that the devices have compatible networking hardware (e.g., WI-FI). The party with compatible networking hardware may initiate an IP address exchange during which the sender and receiver exchange their own IP addresses in order to establish a webRTC connection on top of the already established audio channel. This may occur at any time/stage during the communication period, be it in the mindset of an ongoing audio broadcast or otherwise.

Figure 5A:
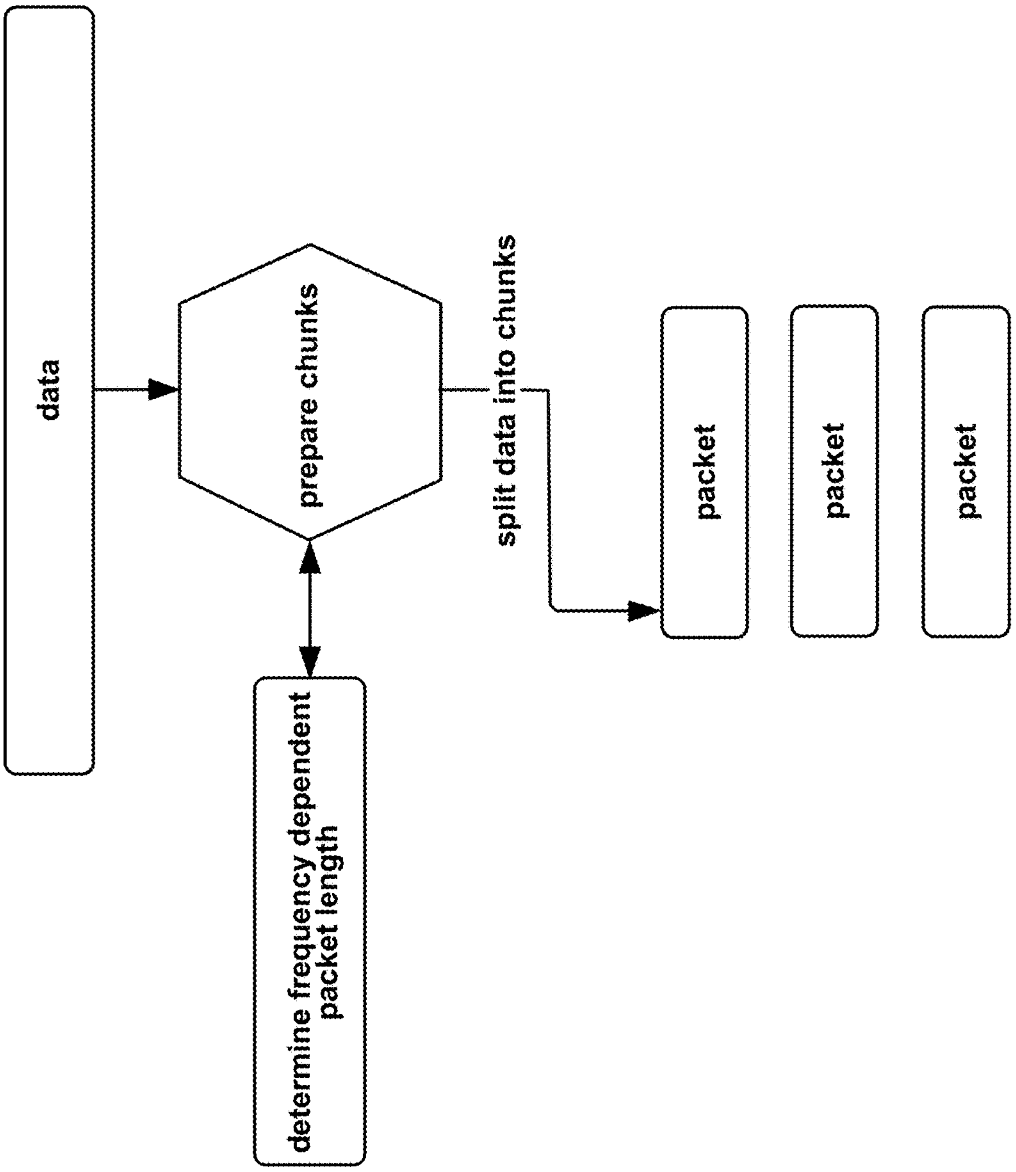
FIG. 5A is a block diagram illustrating the division of data payload into chunks, in accordance with some embodiments.

FIG. 5A is a block diagram illustrating the division of data payload into chunks, in accordance with some embodiments. The protocol takes in data that is desired to be sent and divides the data according to a sound frequency dependent packet length before splitting it into packets to be sent out by the sender. In order to form and send a new packet, the protocol divides the data into ordered chunks according to a specified length that corresponds to the amount of data that is able to be transmitted at the corresponding specified sound frequency range.

Figure 5B:
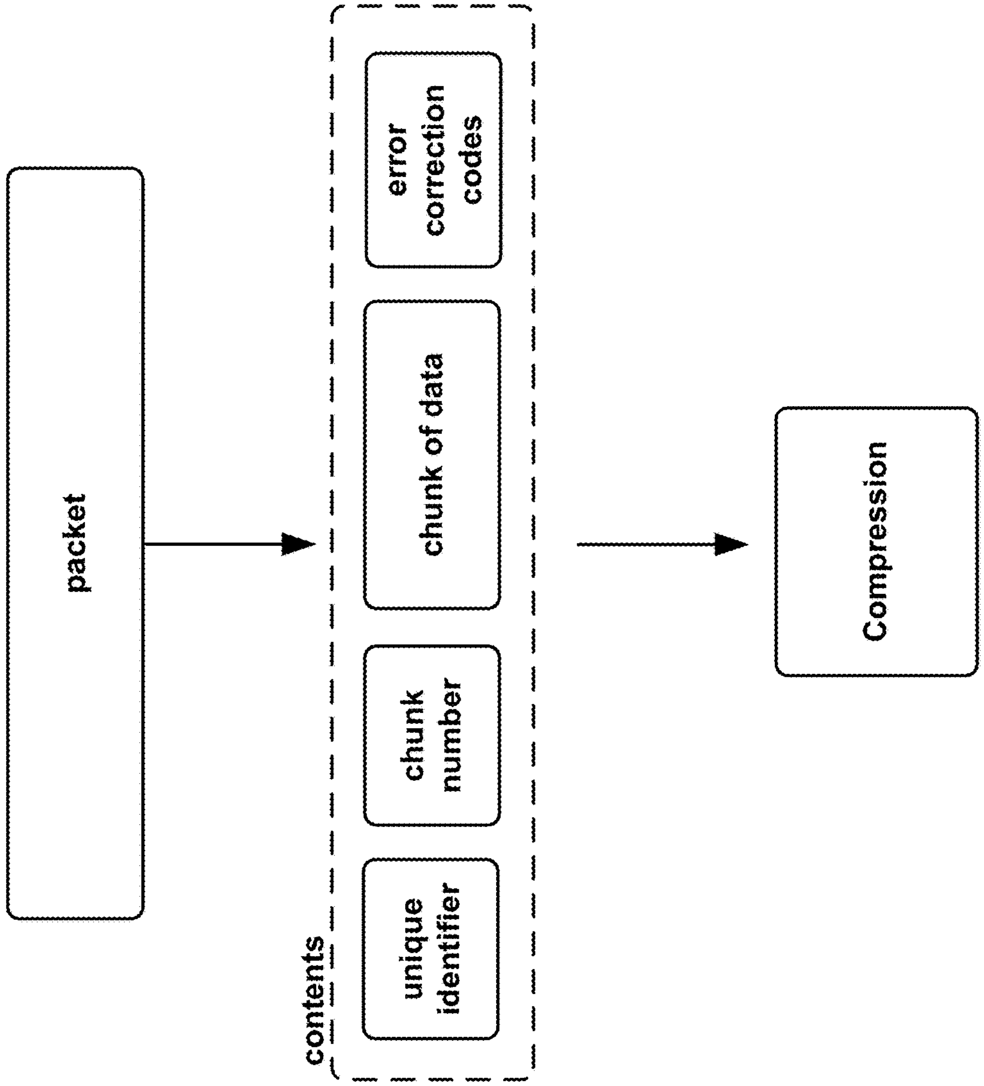
FIG. 5B is a conceptual diagram illustrating an example of a packet header in use for the in-person contactless communication protocol, in accordance with some embodiments.

FIG. 5B is a conceptual diagram illustrating an example of a packet header in use for the in-person contactless communication protocol, in accordance with some embodiments. Each chunk typically contains an additional unique identifier (e.g., a user identifier or a public address for example) that ties the data back to the sender/sender's device. In order to be compliant with the chunk length, the in-person contactless communication protocol may utilize a compression algorithm to reduce and encode the size of the chunks. The structure and contents of a data chunk packet may include a unique identifier, chunk number (referring to the number of the current chunk in a group), the actual chunk of data prepared by the protocol in the previous figure and error correction codes to ensure reliability of the data being transmitted. The packet is then passed into a compression algorithm and is encoded before the packet is sent by the sender.

When ready for transit, the application 118, based on the in-person contactless communication protocol, can take control of the sender device's speaker 112 in order to continuously broadcast the new packet. The application 118 may first set the device's speaker 112 audio levels to an appropriate level according to the surrounding environment, commonly approximated to fifty percent, then cause the speaker to emit an audio signal that encodes a package associated with a transaction request. The audio signal can be emitted through the speaker at a set rate in the nanosecond-to-millisecond range to ensure reliability of transmission. To avoid collisions, the application 118 may cause the speaker 112 to perform a single broadcast ongoing at any given instance, canceling the broadcast or replacing the broadcast as needed for new chunks/packets.

Figure 6A:
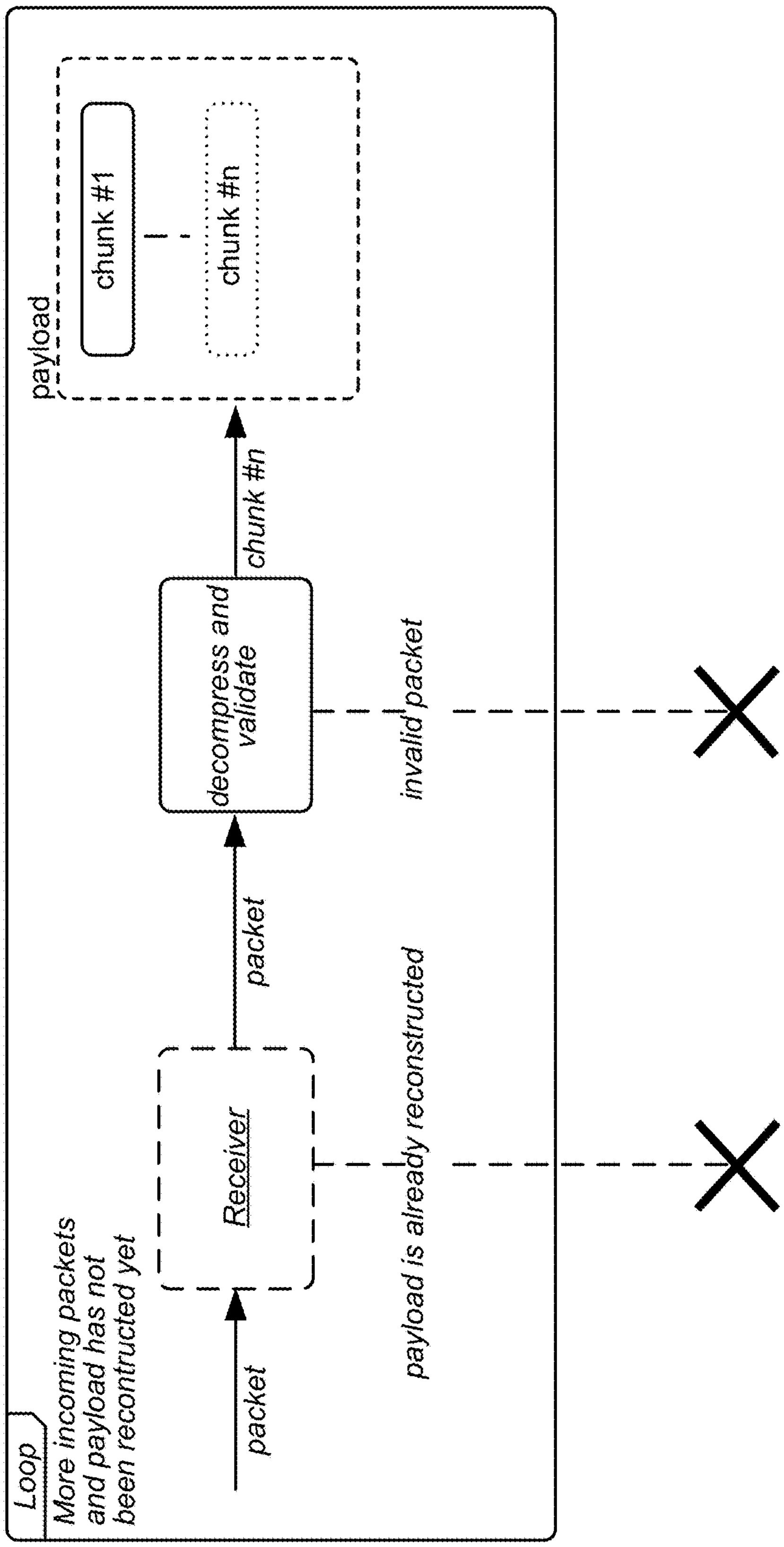
FIG. 6A is a block diagram illustrating an example process for reassembling payload for a receiver device, in accordance with some embodiments.

FIG. 6A is a block diagram illustrating an example process for reassembling payload for a receiver device, in accordance with some embodiments. The protocol utilizes a control loop in which the receiver is responsible for reassembling the data sent from the received packets. On the receiver device, the application 118 activates the device's microphone 114, which is listening to incoming packets. Upon receiving a new packet, the application 118, based on the in-person contactless communication protocol, may check for a unique identifier, if specified, in order to determine the sender and check for the validity of the chunk. The application 118 may check for the validity of the packet by ensuring that the packet is not duplicated and is able to be decompressed properly. The application 118 may decode the packet and/or extract the data chunk inside the packet and inserts the packet into a buffer containing all previously received data chunks, if any, from that specific sender in order to eventually reconstruct the full data that was emitted by the sender, responding accordingly thereafter. The application 118 may also check the order number described in the packet to determine the order in which the receiver's device has received the packet, decompressing, decoding and putting the packet in the right order to eventually construct back the full payload that was sent.

Below is an example pseudocode for operating a one-way mode between a sender device and a receiver device.

```
-- Sender one way send routine:
if previous_broadcast_is_active:
    stop( )
chunks = prepare(data)
while timer is active do:
    for chunk from chunks down to last chunk do:
        send(chunk)
        queue (chunk) // added to queue to be resent
-- Receiver one way receive routine:
validate (incoming_packet)
```

-continued

```
if !valid:
    // exit routine
var order_number = extract_order_number(incoming_packet)
var chunk = extract_chunk(incoming_packet)
if !buffer[order_number]:
    buffer[order_number] = chunk
else
    // disregard chunk
```

Figure 6B:
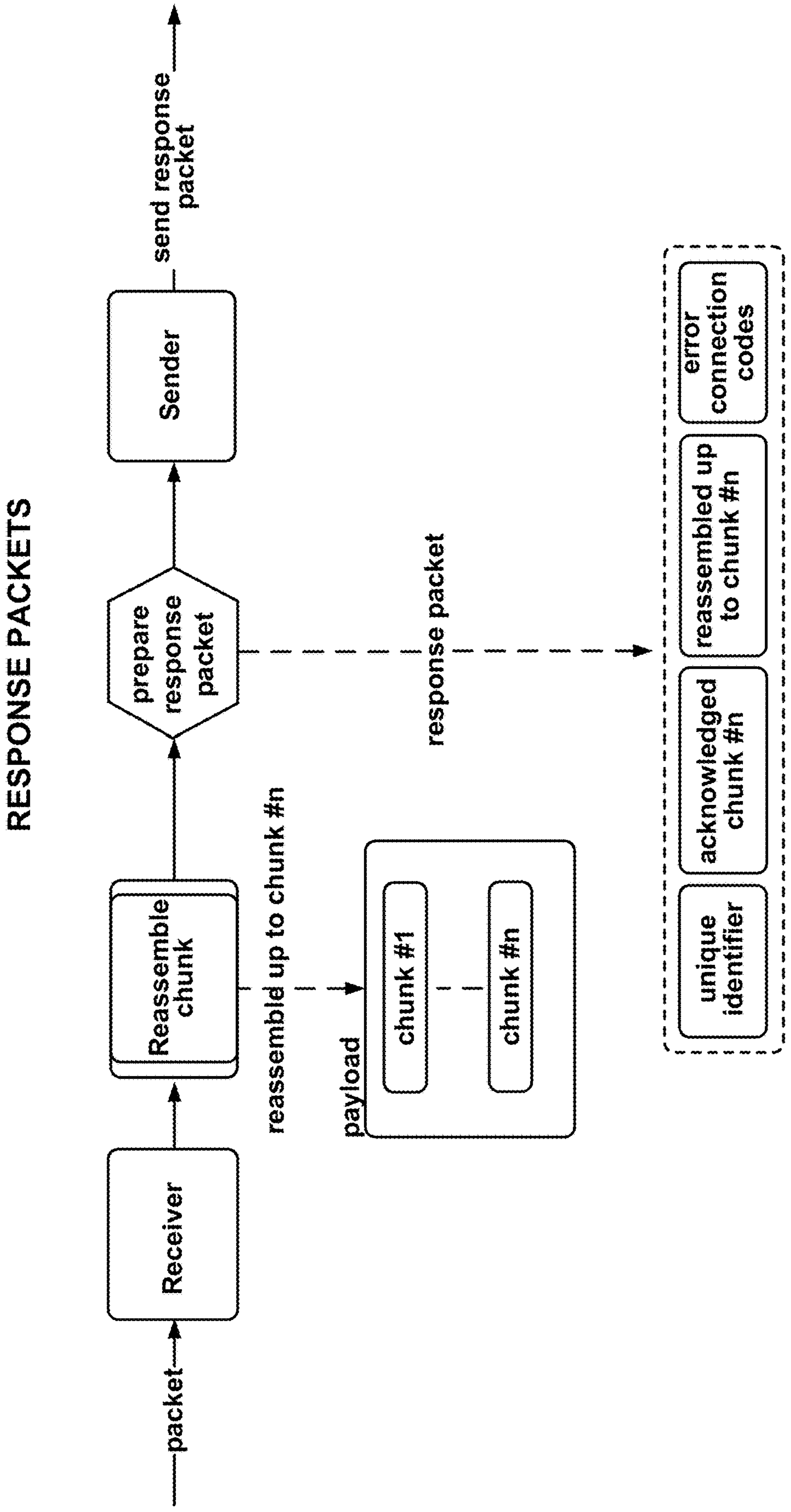
FIG. 6B is a block diagram illustrating an example process for establishing a two-way communication, in accordance with some embodiments.

FIG. 6B is a block diagram illustrating an example process for establishing a two-way communication, in accordance with some embodiments. In the two-way channel mode, the protocol utilizes receiver response packets that are used as a confirmation receipt to the sender. After receiving and reassembling the chunk of data, the receiver can prepare a response packet containing the unique identifier of the receiver, the acknowledged chunk number (the order number of the chunk it had just received and reassembled), the reassembled-up-to chunk number and error correction codes to ensure the reliability of the response packet. In the cases where the user devices 110 are acting in an interactive two-way communication mode, the receiving device may perform further action, such as signing a token. The receiver device may formulate response packets that are sent out. A response packet may include the accepted chunk order number, the largest order number that was received in a consecutive order and the receiver's unique identifier. After compressing and encoding the response packet, the application 118 takes control of the receiver's microphone 112 to transmit the response packet back to the sender's device.

Back on the sender's device, the application 118 uses the device's microphone 112 to listen to the incoming response packets. Upon receiving, the protocol parses the response packet and marks stop transmitting the acknowledged packets according to the largest order number and the last accepted chunk order number found in the response packet, thereby stopping the transmission of that specific chunk/packet. In the event of more than one active communication session, the protocol checks the unique identifier included in the response packet in order to determine the corresponding session. Referring back to FIG. 4B, in the event where both devices have compatible computer networking hardware (e.g., WIFI), the devices may exchange internet protocol addresses (IP) in order to start a peer-to-peer WebRTC session, resulting in two long-living secure and active communication channels.

Below is an example pseudocode for operating a two-way mode between a sender device and a receiver device.

```
-- send_ip_packet_routine:
    var ip = get_own_ip( )
    var exchange_packet = construct_ip_packet(ip)
    send(exchange_packet)
-- Sender two way send routine:
if is_webrtc_session_exchange( ):
    send_ip_packet_routine( )
else
    sender_one_way_send_routine(data)
-- Receiver two way receive routine:
if is_webrtc_session_exchange(incoming_packet):
    send_ip_packet_routine( ) // happens in sender
    establish_webrtc_session( )
else
    receiver_one_way_receive_routine(incoming_packet)
    var response_packet =
create_response(incoming_packet)
```

-continued

```
send(response_packet)
if network_hardware_compaitable( ) and
!is_webrtc_session_active( ):
    send_ip_packet_routine( )
```

In order to preserve the integrity and validity of the packets, the protocol does error correction by utilizing an algorithm that uses Reed-Solomon Codes. Invalid or malformed packets are ignored by the receiver and are retransmitted by the sender's device.

Example Security Features

Below are some example features that enhance the security of the in-person contactless communication protocol to reduce or prevent attacks from malicious parties such as man in the middle attacks.

In some embodiments, in the case of a payment transaction, the "money" itself, is not broadcasted. In this case, a "transaction request" is broadcasted. More precisely, an electronic request in the form of an audio signal is broadcasted, such that the person receiving the electronic transaction request can process the payment by using an electronic payment service. The information that is sent in the audio signal can be encrypted. The information sent in the audio signal can initiate a secure electronic handshake with the receiving device. From that point forward, when someone accepts the transaction request to make a payment, the electronic communication between the parties can be completely encrypted, and the transaction can happen through secure channels.

If a malicious party were to try to man-in-the-middle this, the party would only be able to pay for the bill of the person they are trying to attack. In some embodiments, once the payment request is received, the two parties have been connected, and there is no need to have any additional communication take place over the protocol. The data sent over the broadcast itself be encrypted, or not be encrypted—ether way—is by its design something that does not hold the threat of any loss of funds nor any incentive for a man-in-the-middle to occur.

In some embodiments, the in-person contactless communication protocol may also use physics of sound to enhance security, such as the specific attributes of diffusion, reflection, absorption, propagation, etc. of high frequency sound waves at different decibels. In some embodiments, a higher frequency sound carries a shorter throw distance than lower frequency sound. The in-person contactless communication protocol may operate with sound that falls outside of the audible human spectrum, high-frequency sound, the sound signal travels less far than other sound. The in-person contactless communication protocol may also control the decibels and frequency and distance between devices to limit the range of traveling of the signal sound in a background ambient noise to a short distance (e.g., one foot, or a few inches). This allows two humans holding phones in front of each other, the more fragile high frequency sound waves being blocked from the exterior by so many factors, with a much lower propagation. It is highly doubtful that the harmful data transmission of a malicious party would be able to make it to the victim's device in-tact with the sound waves undistorted by large gaps, waveform steepening or shifting, etc.

In some embodiments, the in-person contactless communication protocol may be limited by distance. For example, in some embodiments, the in-person contactless communication protocol does not work unless the two devices are within approximately 6 inches of each other (or something of that magnitude), the nearness of the two parties creates a physical environmental barrier as well as a social challenge for a man-in-the-middle attack to occur. The attacker would not only have to get his broadcast into the middle of the two devices with a targeted audio transmitting device at the correct decibel level and at the correct frequency with the correct uncorrupted data, but also would have to have a reliable way to spoof the identity of the other user. Since the request displays the identity of the other user when asked for a confirmation, which would require social engineering on a person-by-person, attack by attack basis.

Additionally, considering the higher frequency sound does not travel very far, even if there were remote pineapple style attacks, the devices would need to drop the attacker somewhere very near the victims, and the attack itself would be very easy to discover very quickly, and also source of the attack would be very easy to immediately find. In other words, this is not the type of attack that an attacker would prefer to carry out, because it could not continue to go on for months on end without going unnoticed.

In some embodiments, the in-person contactless communication protocol may also use cryptography and encryption to enhance security. In some embodiments, the system may encrypt the communication. For example, user devices 110 may agree on a secret that is then used to end-to-end encrypt all outgoing and incoming communications between the devices. This may occur in a multitude of ways in various embodiments, which may utilize one or more cryptographic schemes. In some embodiments, the Shamir Secret Sharing scheme is used to establish an encrypted session. In some embodiments, the Diffie-Hellman key exchange is used to establish an encrypted session. In some embodiments, the Double Ratchet algorithm is used to establish an encrypted session. These versions are merely the most common schemes used and are not meant to cover all possible ways used to encrypt the communication.

Example Applications of the Protocol

In some embodiments, the in-person contactless communication protocol may be used for one directional, single channel, payment requests in which the protocol operates in the one-way communication channel mode. Specifically, this type of payment request relies on the sender's device broadcasting the payment request to a nearby device or more.

In some embodiments, a computer device method for orchestrating digital currency payment requests between two devices is used. The two devices are brought close to each other and a payment request is initiated on either end by broadcasting a packet containing the unique identifier of the sender/sender's device, the currency, and the amount. Upon receiving the request, the person on the receiving device is able to see the payment information and accept or decline the request. Upon accepting, the payment request can be sent to a peer-to-peer blockchain to be verified and carry out the transaction.

In some embodiments, a computer method for orchestrating digital currency payment requests between any number of devices spanning three or more is used. The devices are brought near each other and a payment request is initiated on any one of them, allowing for group payment specific features such as splitting the bill. Similarly, the payment requests are handled individually and are sent in the same manner to a peer-to-peer blockchain to be verified and carried out.

In some embodiments, the in-person contactless communication protocol may be used for multi directional, multi-channel, payment requests in which the protocol operates in the interactive two (or more) way communication channel mode. Specifically, this type of payment request relies on exchanging a series of packets back and forth.

In some embodiments, the two (or more) way communication mode may be used for paying digital currencies and receiving digital goods. A person desiring to pay for and receive a digital good brings their device near the device of a person looking to sell said digital good. The protocol then handles exchanging the transaction through a peer-to-peer decentralized blockchain where the transaction will be verified and finalized. Upon completion of the transaction, exchange of the digital good is carried out whereby the ownership transfers from the original owner (seller) to the payee (person that paid).

In some embodiments, the two (or more) way communication mode may be used for verifying digital identity, and receiving digital goods, digital credit and/or digital certificates. A person looking for obtaining digital credit and/or digital certificates is able to do so by initiating a transaction through the protocol that then verifies the digital identity of the person by having them bring their device into vicinity and carries out the transaction needed via a decentralized peer-to-peer blockchain.

In some embodiments, the two (or more) way communication mode may be used for an unlock and pay service feature that can incorporate an Internet of Things device wherein a person can pay for an item and unlock it instantaneously. For example, booking a hotel room: as soon as a person walks up to a hotel room and initiates a purchase request, the door's lock responds by sending a payment request alongside the room information (such as picture of room inside, rules, etc.). Upon accepting the payment, the protocol sends the payment to a peer-to-peer decentralized blockchain to verify and carry out the payment. Upon completion of the transaction, a digital key that lasts for the duration of stay alongside a confirmation of payment is sent by the door, granting the person access to the room and providing them with extra hotel loyalty tokens as discounts for things such as room service.

In some embodiments, the in-person contactless communication protocol may be used for multi-factor authentication method used to verify and confirm physical presence. Using the two-way communication mode, the protocol is able to verify and authorize various identity requests (digital wallets requests as an example).

For example, in some embodiments, the multi-factor authentication method may be used to verify sign-in and log-in requests. When a person desires to sign in or sign up for a service that requires multi-factor authentication, the protocol will initiate a verification request that prompts the person to bring one of their devices nearby in order to verify their identity and handle sign/logg-ing them into the service in question.

For example, in some embodiments, the multi-factor authentication method may be used to verify election security and voting. The protocol affords for voter identification and confirming the voter's vote. The voter is able to verify their identity by bringing their device near another (preferably one that is handling the voting/voting verification) whereupon the protocol initiates an identity verification request via a peer-to-peer decentralized blockchain where the request will be verified and confirmed in order to ensure legitimacy of the vote.

For example, in some embodiments, the multi-factor authentication method may be used to verify membership status and allow admission to venues and events by verifying invites and tickets. Upon entry, a person's membership status/ticket is validated by the protocol sending a verification request to a peer-to-peer blockchain. Upon completion of the verification, the person is granted entry.

In some embodiments, the in-person contactless communication protocol may be used for secure tunnel for communication. Utilizing the two-way, multi-channel communication mode, devices are able to set up a secure communication tunnel to exchange any form of data over the protocol, such as a private chat message or a note sent from one device to the other. In addition, through the affordances provided by this mode, the protocol is able to transform this short term communication tunnel to a long-lasting session whereby participating parties are able to maintain a secured mode of communication for as long as desired.

Example Blockchain Architecture

FIG. 7A is a block diagram illustrating a chain of transactions broadcasted and recorded on a blockchain, in accordance with an embodiment. The transactions described in FIG. 7A may correspond to any of the transactions and the transfer of blockchain-based units described in previous figures. These steps may occur as two parties complete a transaction using the in-person contactless communication protocol and the transaction is blockchain related.

In some embodiment, a blockchain is a distributed system. A distributed blockchain network may include a plurality of nodes. Each node is a user or a server that participates in the blockchain network. In a public blockchain, any participant may become a node of the blockchain. The nodes collectively may be used as a distributed computing system that serves as a virtual machine of the blockchain. In some embodiments, the virtual machine or a distributed computing system may be simply referred to as a computer. Any users of a public blockchain may broadcast transactions for the nodes of the blockchain to record. Each user's digital wallet is associated with a private cryptographic key that is used to sign transactions and prove the ownership of a blockchain-based unit.

The ownership of a blockchain-based unit may be traced through a chain of transactions. In FIG. 7A, a chain of transactions may include a first transaction 710, a second transaction 720, and a third transaction 730, etc. Each of the transactions in the chain may have a fairly similar structure except the very first transaction in the chain. The first transaction of the chain may be generated by a smart contract or a mining process and may be traced back to the smart contract that is recorded on the blockchain or the first block in which it was generated. While each transaction is linked to a prior transaction in FIG. 7A, the transaction does not need to be recorded on consecutive blocks on the blockchain. For example, the block recording the transaction 710 and the block recording the transaction 720 may be separated by hundreds or even thousands of blocks. The traceback of the prior block is tracked by the hash of the prior block that is recorded by the current block. In some embodiments, an account model is used and transactions do not have any references to previous transactions. Thus, transactions are not chained and does not contain the hash of the previous transaction.

Referring to one of the transactions in FIG. 7A, for illustration, the transaction 720 may be referred to as a current transaction. Transaction 710 may be referred to as a prior transaction and transaction 730 may be referred to as a subsequent transaction. Each transaction includes a transaction data (e.g., 722), a recipient address (e.g., 724), a hash of the prior transaction (e.g., 726), and the current transaction's owner's digital signature (e.g., 728). The transaction data 722 records the substance of the current transaction 720. For example, the transaction data 722 may specify a transfer of a quantity of a blockchain-based unit (e.g., a coin, a blockchain token, etc.). In some embodiments, the transaction data 722 may include code instructions of a smart contract.

The recipient address 724 is a version of the public key that corresponds to the private key of the digital wallet of the recipient. In one embodiment, the recipient address 724 is the public key itself. In another embodiment, the recipient address 724 an encoded version of the public key through one or more functions such as some deterministic functions. For example, the generation of the recipient address 724 from the public key may include hashing the public key, adding a checksum, adding one or more prefixes or suffixes, encoding the resultant bits, and truncating the address. The recipient address 724 may be a unique identifier of the digital wallet of the recipient on the blockchain.

The hash of the prior transaction 726 is the hash of the entire transaction data of the prior transaction 710. Likewise, the hash of the prior transaction 736 is the hash of the entire transaction data of the transaction 720. The hashing of the prior transaction 710 may be performed using a hashing algorithm such as a secure hash algorithm (SHA) or a message digest algorithm (MD). In some embodiments, the owner corresponding to the current transaction 720 may also use the public key of the owner to generate the hash. The hash of prior transaction 726 provides a traceback of the prior transaction 710 and also maintains the data integrity of the prior transaction 710.

In generating a current transaction 720, the digital wallet of the current owner of the blockchain-based unit uses its private key to encrypt the combination of the transaction data 722, the recipient address 724, and the hash of prior transaction 726 to generate the owner's digital signature 728. To generate the current transaction 720, the current owner specifies a recipient by including the recipient address 724 in the digital signature 728 of the current transaction 720. The subsequent owner of the blockchain-based unit is fixed by the recipient address 724. In other words, the subsequent owner that generates the digital signature 738 in the subsequent transaction 730 is fixed by the recipients address 724 specified by the current transaction 720. To verify the validity of the current transaction 720, any nodes in the blockchain network may trace back to the prior transaction 710 (by tracing the hash of prior transaction 726) and locate the recipient address 714. The recipient address 714 corresponds to the public key of the digital signature 728. Hence, the nodes in the blockchain network may use the public key to verify the digital signature 728. Hence, a current owner who has the blockchain-based unit tied to the owner's blockchain address can prove the ownership of the blockchain-based unit. In this disclosure, it can be described as the blockchain-based unit being connected to a public cryptographic key of a party because the blockchain address is derived from the public key.

The transfer of ownership of a blockchain-based unit may be initiated by the current owner of the blockchain-based unit. To transfer the ownership, the owner may broadcast the transaction that includes the digital signature of the owner and a hash of the prior transaction. A valid transaction with a verifiable digital signature and a correct hash of the prior transaction will be recorded in a new block of the blockchain through the block generation process.

FIG. 7B is a block diagram illustrating a connection of multiple blocks in a blockchain, in accordance with an embodiment. Each block of a blockchain, except the very first block which may be referred to as the genesis block, may have a similar structure. The blocks 750, 760, and 770 may each include a hash of the prior blockchain, a nonce, and a plurality of transactions (e.g., a first transaction 756, a second transaction 758, etc.). Each transaction may have the structure shown in FIG. 7A.

In a block generation process, a new block may be generated through mining or voting. For a mining process of a blockchain, any nodes in the blockchain system may participate in the mining process. The generation of the hash of the prior block may be conducted through a trial and error process. The entire data of the prior block (or a version of the prior block such as a simplified version) may be hashed using the nonce as a part of the input. The blockchain may use a certain format in the hash of the prior block in order for the new block to be recognized by the nodes as valid. For example, in one embodiment, the hash of the prior block needs to start with a certain number of zeroes in the hash. Other criteria of the hash of the prior block may also be used, depending on the implementation of the blockchain.

In a voting process, the nodes in a blockchain system may vote to determine the content of a new block. Depending on the embodiment, a selected subset of nodes or all nodes in the blockchain system may participate in the votes. When there are multiple candidate new blocks that include different transactions are available, the nodes will vote for one of the blocks to be linked to the existing block. The voting may be based on the voting power of the nodes.

By way of example of a block generation process using mining, in generating the hash of prior block 762, a node may randomly combine a version of the prior block 750 with a random nonce to generate a hash. The generated hash is somewhat a random number due to the random nonce. The node compares the generated hash with the criteria of the blockchain system to check if the criteria are met (e.g., whether the generated hash starts with a certain number of zeroes in the hash). If the generated hash fails to meet the criteria, the node tries another random nonce to generate another hash. The process is repeated for different nodes in the blockchain network until one of the nodes find a hash that satisfies the criteria. The nonce that is used to generate the satisfactory hash is the nonce 764. The node that first generates the hash 762 may also select what transactions that are broadcasted to the blockchain network are to be included in the block 760. The node may check the validity of the transaction (e.g., whether the transaction can be traced back to a prior recorded transaction and whether the digital signature of the generator of the transaction is valid). The selection may also depend on the number of broadcasted transactions that are pending to be recorded and also the fees that may be specified in the transactions. For example, in some embodiments, each transaction may be associated with a fee (e.g., gas) for having the transaction recorded. After the transactions are selected and the data of the block 760 is fixed, the nodes in the blockchain network repeat the trial and error process to generate the hash of prior block 772 by trying different nonce. In embodiments that use voting to generate new blocks, a nonce may not be needed. A new block may be linked to the prior block by including the hash of the prior block.

New blocks may be continued to be generated through the block generation process. A transaction of a blockchain-based unit (e.g., an electronic coin, a blockchain token, etc.) is complete when the broadcasted transaction is recorded in a block. In some embodiment, the transaction is considered settled when the transaction is considered final. A transaction is considered final when there are multiple subsequent blocks generated and linked to the block that records the transaction.

In some embodiments, some of the transactions 756, 758, 766, 768, 776, 778, etc. may include one or more smart contracts. The code instructions of the smart contracts are recorded in the block and are often immutable. When conditions are met, the code instructions of the smart contract are triggered. The code instructions may cause a computer (e.g., a virtual machine of the blockchain) to carry out some actions such as generating a blockchain-based unit and broadcasting a transaction documenting the generation to the blockchain network for recordation.

Computing Machine Architecture

Figure 8:
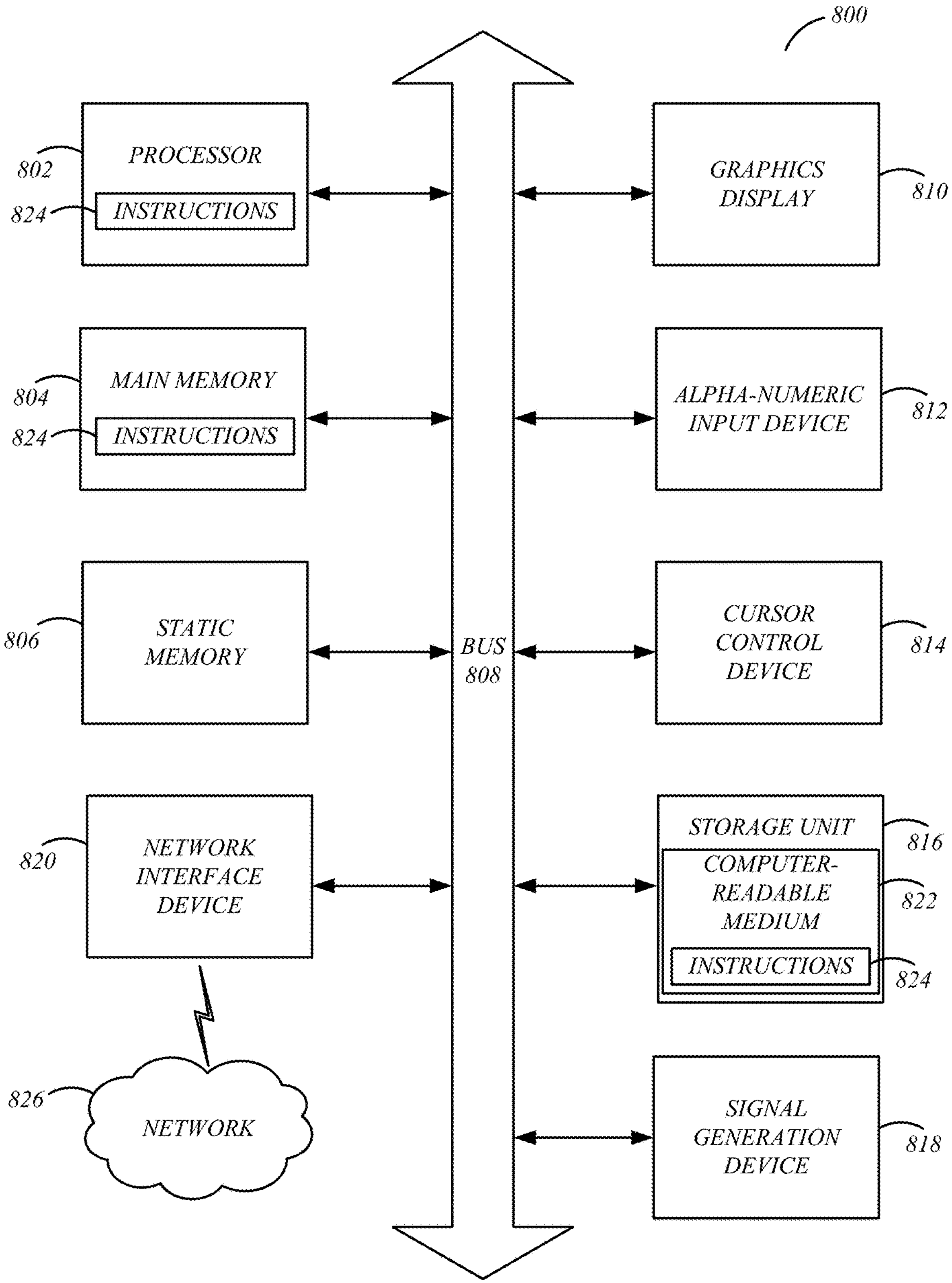
FIG. 8 is a block diagram illustrating components of an example computing machine that is capable of reading instructions from a computer-readable medium and execute them in a processor.

FIG. 8 is a block diagram illustrating components of an example computing machine that is capable of reading instructions from a computer-readable medium and execute them in a processor. A computer described herein may include a single computing machine shown in FIG. 8, a virtual machine, a distributed computing system that includes multiples nodes of computing machines shown in FIG. 8, or any other suitable arrangement of computing devices.

By way of example, FIG. 8 shows a diagrammatic representation of a computing machine in the example form of a computer system 800 within which instructions 824 (e.g., software, program code, or machine code), which may be stored in a computer-readable medium for causing the machine to perform any one or more of the processes discussed herein may be executed. In some embodiments, the computing machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The structure of a computing machine described in FIG. 8 may correspond to any software, hardware, or combined components shown in FIG. 1, including but not limited to, the user device 110, the transaction record server 130, a node of a blockchain network, and various engines, modules interfaces, terminals, and machines in various figures. While FIG. 8 shows various hardware and software elements, each of the components described in FIG. 1 may include additional or fewer elements.

By way of example, a computing machine may be a personal computer (PC), a tablet PC, a set-top box (STB), a personal digital assistant (PDA), a cellular telephone, a smartphone, a web appliance, a network router, an internet of things (IoT) device, a switch or bridge, or any machine capable of executing instructions 824 that specify actions to be taken by that machine. Further, while only a single machine is illustrated, the term "machine" shall also be taken to include any collection of machines that individually or jointly execute instructions 824 to perform any one or more of the methodologies discussed herein.

The example computer system 800 includes one or more processors (generally, processor 802) (e.g., a central processing unit (CPU), a graphics processing unit (GPU), a digital signal processor (DSP), one or more application-specific integrated circuits (ASICs), one or more radio-frequency integrated circuits (RFICs), or any combination of these), a main memory 804, and a static memory 806, which are configured to communicate with each other via a bus 808. The computer system 800 may further include graphics display unit 810 (e.g., a plasma display panel (PDP), a liquid crystal display (LCD), a projector, or a cathode ray tube (CRT)). The computer system 800 may also include alphanumeric input device 812 (e.g., a keyboard), a cursor control device 814 (e.g., a mouse, a trackball, a joystick, a motion sensor, or other pointing instrument), a storage unit 816, a signal generation device 818 (e.g., a speaker), and a network interface device 820, which also are configured to communicate via the bus 808.

The storage unit 816 includes a computer-readable medium 822 on which is stored instructions 824 embodying any one or more of the methodologies or functions described herein. The instructions 824 may also reside, completely or at least partially, within the main memory 804 or within the processor 802 (e.g., within a processor's cache memory) during execution thereof by the computer system 800, the main memory 804 and the processor 802 also constituting computer-readable media. The instructions 824 may be transmitted or received over a network 826 via the network interface device 820.

While computer-readable medium 822 is shown in an example embodiment to be a single medium, the term "computer-readable medium" should be taken to include a single medium or multiple media (e.g., a centralized or distributed database, or associated caches and servers) able to store instructions (e.g., instructions 824). The computer-readable medium may include any medium that is capable of storing instructions (e.g., instructions 824) for execution by the machine and that cause the machine to perform any one or more of the methodologies disclosed herein. The computer-readable medium may include, but not be limited to, data repositories in the form of solid-state memories, optical media, and magnetic media. The computer-readable medium does not include a transitory medium such as a signal or a carrier wave.

Additional Configuration Considerations

Beneficially, with various embodiments described in this disclosure, in a cryptographically proofed, cost-efficient way, smart contract (or other Web3 application) owners could add an interface to their applications to have control over the applications after being deployed to the blockchain. In addition, the application publishers could also apply security technologies to control the applications in real-time. Since the interactions would be vetted and signed by the access control system before the interaction request reaches the application on the blockchain, the access control server can block and prevent malicious or unwanted actions.

Certain embodiments are described herein as including logic or a number of components, engines, modules, or mechanisms. Engines may constitute either software modules (e.g., code embodied on a computer-readable medium) or hardware modules. A hardware engine is a tangible unit capable of performing certain operations and may be configured or arranged in a certain manner. In example embodiments, one or more computer systems (e.g., a standalone, client or server computer system) or one or more hardware engines of a computer system (e.g., a processor or a group of processors) may be configured by software (e.g., an application or application portion) as a hardware engine that operates to perform certain operations as described herein.

In various embodiments, a hardware engine may be implemented mechanically or electronically. For example, a hardware engine may comprise dedicated circuitry or logic that is permanently configured (e.g., as a special-purpose processor, such as a field programmable gate array (FPGA) or an application-specific integrated circuit (ASIC)) to perform certain operations. A hardware engine may also comprise programmable logic or circuitry (e.g., as encompassed within a general-purpose processor or another programmable processor) that is temporarily configured by software to perform certain operations. It will be appreciated that the decision to implement a hardware engine mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 802, that are temporarily configured (e.g., by software) or permanently configured to perform the relevant operations. Whether temporarily or permanently configured, such processors may constitute processor-implemented engines that operate to perform one or more operations or functions. The engines referred to herein may, in some example embodiments, comprise processor-implemented engines.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Upon reading this disclosure, those of skill in the art will appreciate still additional alternative structural and functional designs for a similar system or process through the disclosed principles herein. Thus, while particular embodiments and applications have been illustrated and described, it is to be understood that the disclosed embodiments are not limited to the precise construction and components disclosed herein. Various modifications, changes, and variations, which will be apparent to those skilled in the art, may be made in the arrangement, operation and details of the method and apparatus disclosed herein without departing from the spirit and scope defined in the appended claims.

The invention claimed is:

1. A computer-implemented method, comprising:

causing a speaker of a sender device to generate an initial audio signal that encodes a package associated with a transaction request, the transaction request comprising a handshake request for establishing a two-way session between the sender device and a receiver device;

initiating an audio handshake session between the sender device and the receiver device, wherein the audio handshake session is conducted via one or more audio signals including the initial audio signal, wherein the audio handshake session comprises:

verifying physical proximity between the sender device and the receiver device based at least in part on decibel level of one or more audio signals received by a microphone of the receiver device in the audio handshake session, and creating a session key in the audio handshake session;

establishing a secure electronic session through the audio handshake session;

conducting a transaction in the secure electronic session using the session key between the sender device and the receiver device.

2. The computer-implemented method of claim 1 further comprising aligning a direction of the speaker generating the audio signal at the sender device towards the microphone of the receiver device to improve reception of the audio signal by the receiver device.

3. The computer-implemented method of claim 1, further comprising maintaining the speaker of the sender device and the microphone of the receiver device within a predetermined distance to improve reception of the audio signal by the receiver device.

4. The computer-implemented method of claim 1, wherein the audio signal comprises an inaudible sound that is in a frequency range of human hearing.

5. The computer-implemented method of claim 1 further comprising listening, by the receiver device, for audio signals that encode packages associated with transaction requests.

6. The computer-implemented method of claim 1 further comprising interacting with a decoded package and a transaction service to process the transaction.

7. The computer-implemented method of claim 6, wherein the transaction service is a payment service or a file transfer service.

8. The computer-implemented method of claim 1, wherein the package associated with the transaction request comprises a file format including any one of: a user identifier, a merchant identifier, a payment processor, a payment gateway, a transaction type, a payment total, a currency code, a wallet address, an IP address, a public key, and an encryption key.

9. The computer-implemented method of claim 1, wherein the audio signal is modulated using frequency-shift keying (FSK),
binary frequency-shift keying (BFSK),
continuous-phase frequency-shift keying (CPFSK),
Gaussian frequency-shift keying (GFSK),
minimum-shift keying (MSK),
differential phase-shift keying (DPSK),
offset quadrature phase-shift keying (OQPSK), or
continuous phase modulation (CPM).

10. The computer-implemented method of claim 1, further comprising encrypting the package associated with the transaction request prior to generating the audio signal associated with said package.

11. A system comprising:

a sender device configured to generate an initial audio signal that encodes a package associated with a transaction request; and a receiver device configured to receive the initial audio signal and decode the initial audio signal to receive a handshake request for establishing a two-way session between the sender device and the receiver device as part of conducting a transaction, wherein the transaction comprises:

initiating an audio handshake session between the sender device and the receiver device, wherein the audio handshake session is conducted via one or more audio signals including the initial audio signal, wherein the audio handshake session comprises:

verifying physical proximity between the sender device and the receiver device based at least in part on decibel level of one or more audio signals received by a microphone of the receiver device in the audio handshake session, and creating a session key in the audio handshake session;

establishing a secure electronic session through the audio handshake session;

conducting a transaction in the secure electronic session using the session key between the sender device and the receiver device.

12. The system of claim 11, wherein a direction of a speaker generating the audio signal at the sender device is configured to align with a microphone of the receiver device to improve reception of the audio signal by the receiver device.

13. The system of claim 11, wherein the audio signal comprises an inaudible sound that is in a frequency range of human hearing.

14. The system of claim 11, wherein the receiver device is configured to listen for audio signals that encode packages associated with transaction requests.

15. The system of claim 11, wherein an application on the receiver device is configured to process the transaction based on a decoded package and a transaction service.

16. The system of claim 15, wherein the transaction service is a payment service or a file transfer service.

17. The system of claim 11, wherein the package associated with the transaction request comprises a file format including any one of: a user identifier, a merchant identifier, a payment processor, a payment gateway, a transaction type, a payment total, a currency code, a wallet address, an IP address, a public key, and an encryption key.

18. The system of claim 11, wherein the sender device is configured to modulate the audio signal using frequency-shift keying (FSK),
binary frequency-shift keying (BFSK),
continuous-phase frequency-shift keying (CPFSK),
Gaussian frequency-shift keying (GFSK),
minimum-shift keying (MSK),
differential phase-shift keying (DPSK),
offset quadrature phase-shift keying (OQPSK), or
continuous phase modulation (CPM).

19. A device comprising:

a processor; and a computer readable medium coupled to the processor, the computer readable medium comprising code, wherein the code, when executed by the processor, cause the processor to perform a process comprising:

causing a speaker of a sender device to generate an initial audio signal that encodes a package associated with a transaction request, the transaction request comprising a handshake request for establishing a two-way session between the sender device and a receiver device;

initiating an audio handshake session between the sender device and the receiver device, wherein the audio handshake session is conducted via one or more audio signals including the initial audio signal, wherein the audio handshake session comprises:

verifying physical proximity between the sender device and the receiver device based at least in part on decibel level of one or more audio signals received by a microphone of the receiver device in the audio handshake session, and creating a session key in the audio handshake session;

establishing a secure electronic session through the audio handshake session;

conducting a transaction in the secure electronic session using the session key between the sender device and the receiver device.

20. The device of claim 19, wherein the audio signal comprises an inaudible sound that is in a frequency range of human hearing.

* * * * *